(12) United States Patent
Liang et al.

(10) Patent No.: US 12,538,273 B2
(45) Date of Patent: Jan. 27, 2026

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 407 days.

(21) Appl. No.: 17/793,513

(22) PCT Filed: Jan. 21, 2020

(86) PCT No.: PCT/CN2020/073423
§ 371 (c)(1),
(2) Date: Jul. 18, 2022

(87) PCT Pub. No.: WO2021/146892
PCT Pub. Date: Jul. 29, 2021

(65) Prior Publication Data
US 2023/0124181 A1    Apr. 20, 2023

(51) Int. Cl.
*H04W 72/0446*    (2023.01)
*H04L 5/00*    (2006.01)

(52) U.S. Cl.
CPC ....... *H04W 72/0446* (2013.01); *H04L 5/0094* (2013.01)

(58) Field of Classification Search
CPC .............. H04W 72/0446; H04W 72/23; H04L 5/0094; H04L 1/08; H04L 1/1822;
(Continued)

(56) References Cited

U.S. PATENT DOCUMENTS

2010/0087151 A1    4/2010 Auer
2013/0244676 A1    9/2013 Koivisto et al.
(Continued)

FOREIGN PATENT DOCUMENTS

CN    107154911 A    9/2017
CN    108476110 A    8/2018
(Continued)

OTHER PUBLICATIONS

Extended European Search Report dated Dec. 14, 2022 in European Application No. 20916189.2.
(Continued)

*Primary Examiner* — Mang Hang Yeung
(74) *Attorney, Agent, or Firm* — Sughrue Mion, PLLC

(57) ABSTRACT

Embodiments of the present disclosure provide a solution for coverage enhancement. In a method for communication, a terminal device receives, from a network device, information on an inferring relation between a first channel associated with a first slot and a second channel associated with a second slot. The terminal device determines, based on the information, whether the first and second channels are to be inferable from each other. In accordance with a determination that the first and second channels are to be inferable from each other, the terminal device performs communications with the network device on the first and second channels based on the inferring relation. Embodiments of the present disclosure effectively enhance coverage of communications, thereby improving communication performance.

18 Claims, 9 Drawing Sheets

(58) Field of Classification Search
CPC . H04L 25/0204; H04L 5/0044; H04L 5/0007; H04L 5/0048; H04B 7/0617
USPC .......................................................... 370/329
See application file for complete search history.

(56) References Cited

U.S. PATENT DOCUMENTS

| | | | |
|---|---|---|---|
| 2016/0226639 A1* | 8/2016 | Xiong | ........................ H04L 1/08 |
| 2019/0349180 A1 | 11/2019 | Lu et al. | |
| 2019/0364579 A1 | 11/2019 | Zhang et al. | |
| 2020/0007294 A1* | 1/2020 | Yang | ..................... H04L 5/0055 |
| 2020/0259625 A1* | 8/2020 | Papasakellariou | ... H04B 7/0456 |
| 2021/0194556 A1* | 6/2021 | Ly | ........................... H04L 5/001 |

FOREIGN PATENT DOCUMENTS

| | | |
|---|---|---|
| CN | 110167152 A | 8/2019 |
| EP | 3462664 A1 | 4/2019 |
| JP | 2010-088116 A | 4/2010 |
| WO | 2018/175446 A1 | 9/2018 |
| WO | 2019/244207 A1 | 12/2019 |
| WO | 2021/108653 A1 | 6/2021 |

OTHER PUBLICATIONS

3GPP, "3GPP Draft", TS 36.211, V15.8.0, Release 15, Dec. 17, 2019, F-06921 Sophia-Antipolis Cedex; France, (52 pages total).

Chinese Office Action for CN Application No. 202080094091.3 mailed on Feb. 6, 2024 with English Translation.
JP Office Action for JP Application No. 2022-544220, mailed on Aug. 1, 2023 with English Translation.
Qualcomm Incorporated, "Remaining Details on QCL", 3GPP TSG RAN WG1 #93 R1-1807398, pp. 1-pp. 10., May 25, 2018, Busan, Korea.
CATT, "Considerations on multi-TRP/panel transmission", 3GPP TSG RAN WG1 #98bis R1-1910349, pp. 1-pp. 25., Oct. 20, 2019, Chongqing, China.
CN Official Communication for CN Application No. 202080094091.3, mailed on May 1, 2024 with English Translation.
JP Official Communication for JP Application No. 2023-135093, mailed on Jul. 23, 2024 with English Translation.
Huawei, Hisilicon et al., "PUSCH enhancements for URLLC", 3GPP TSG RAN WG1 Meeting #95, R1-1812223, Nov. 12-16, 2018, Spokane, USA, 6 pages.
Huawei, Hisilicon et al., "PUSCH enhancements for URLLC", 3GPP TSG RAN WG1 Meeting #96 R1-1901559, Feb. 25-Mar. 1, 2019, Athens, Greece, 13 pages.
Ericsson, "DL reference signals for NR positioning", 3GPP TSG-RAN WG1 Meeting #99, R1-1913135, Nov. 18-22, 2019, Reno, NV, USA, 25 pages.
China Telecom (Email discussion moderator), "Summary of Phase 2 email discussion on NR coverage enhancement", 3GPP TSG RAN Meeting #86, RP-192562, Dec. 9-12, 2019, Sitges, Spain, 19 pages.
International Search Report for PCT/CN2020/073423, dated Oct. 23, 2020.
Written Opinion for PCT/CN2020/073423, dated Oct. 23, 2020.

* cited by examiner

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of Application No. PCT/CN2020/073423 filed Jan. 21, 2020.

FIELD

Embodiments of the present disclosure generally relate to the field of communication, and more particularly, to a solution for coverage enhancement.

BACKGROUND

The latest developments of the Third Generation Partnership Project (3GPP) standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the 3GPP to meet new requirements associated with latency, reliability, security, scalability (for example, with Internet of Things), and other requirements. Some aspects of the 5G NR may be based on the 4G Long Term Evolution (LTE) standards.

In the 5G NR, coverage is one of the key factors that an operator considers when commercializing cellular communication networks due to its direct impact on service quality as well as Capital Expenditure (CAPEX) and Operating Expense (OPEX). Despite the importance of coverage on the success of NR commercialization, a thorough coverage evaluation and a comparison with legacy RATs considering all NR specification details have not been done up to now.

SUMMARY

In general, example embodiments of the present disclosure provide a solution for coverage enhancement.

In a first aspect, there is provided a method for communication. The method comprises receiving, at a terminal device from a network device, information on an inferring relation between a first channel associated with a first slot and a second channel associated with a second slot. The method also comprises determining, based on the information, whether the first and second channels are to be inferable from each other. The method further comprises in accordance with a determination that the first and second channels are to be inferable from each other, performing communications with the network device on the first and second channels based on the inferring relation.

In a second aspect, there is provided a method for communication. The method comprises receiving, at a terminal device from a network device, an indication of an early termination of a plurality of transmissions of same data between the terminal device and the network device. The method also comprises in accordance with a determination that the plurality of transmissions are not completed, determining that the rest of the plurality of transmissions are to be stopped.

In a third aspect, there is provided a method for communication. The method comprises determining, at a network device, whether a first channel associated with a first slot and a second channel associated with a second slot are to be inferable from each other. The method also comprises transmitting, to a terminal device, information on an inferring relation between the first channel and the second channel. The method further comprises in accordance with a determination that the first and second channels are to be inferable from each other, performing communications with the terminal device on the first and second channels based on the inferring relation.

In a fourth aspect, there is provided a method for communication. The method comprises determining, at a network device, that a plurality of transmissions of same data between the network device and a terminal device are not completed and the rest of the plurality of transmissions are to be stopped. The method also comprises transmitting, to the terminal device, an indication of an early termination of the plurality of transmissions.

In an fifth aspect, there is provided a terminal device. The terminal device comprises a processor and a memory storing instructions. The memory and the instructions are configured, with the processor, to cause the terminal device to perform the method according to the first or second aspect.

In a sixth aspect, there is provided a network device. The network device comprises a processor and a memory storing instructions. The memory and the instructions are configured, with the processor, to cause the network device to perform the method according to the third or fourth aspect.

In a seventh aspect, there is provided a computer readable medium having instructions stored thereon. The instructions, when executed on at least one processor of a device, cause the device to perform the method according to the first or second aspect.

In an eighth aspect, there is provided a computer readable medium having instructions stored thereon. The instructions, when executed on at least one processor of a device, cause the device to perform the method according to the third or fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
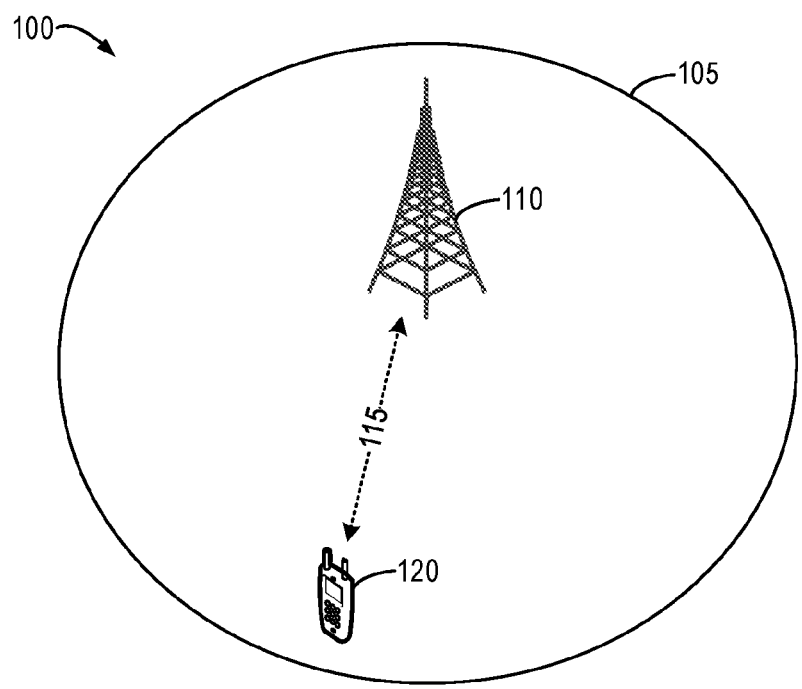
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X (vehicle-to-everything) communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

In some embodiments, a terminal device may be connected with a first network device and a second network device. One of the first network device and the second network device may be a master node and the other one may be a secondary node. The first network device and the second network device may use different radio access technologies (RATs). In some embodiments, the first network device may be a first RAT device and the second network device may be a second RAT device. In some embodiments, the first RAT device is an eNB and the second RAT device is a gNB. Information related to different RATs may be transmitted to the terminal device from at least one of the first network device and the second network device. In some embodiments, first information may be transmitted to the terminal device from the first network device and second information may be transmitted to the terminal device from the second network device directly or via the first network device. In some embodiments, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the term "transmission reception point," "transmission/reception point," or "transmission and reception point" may generally indicate a station communicating with the user equipment. However, the transmission and reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission and reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission and reception point, the base station (BS), and/or the cell may include a variety of coverage areas such as a mega-cell, a macro-cell, a micro-cell, a pico-cell, a femto-cell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present disclosure, and may not be limited to a specific term or word. As used herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the term "resource," "transmission resource," "resource block," "physical resource block," "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some embodiments of the present disclosure. It is noted that embodiments of the present disclosure are equally applicable to other resources in other domains.

As used herein, the singular forms "a," "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As mentioned, coverage is one of the key factors that an operator considers when commercializing cellular communication networks due to its direct impact on service quality as well as CAPEX and OPEX. Despite the importance of coverage on the success of NR commercialization, a thorough coverage evaluation and a comparison with legacy RATs considering all NR specification details have not been done up to now.

Compared to LTE, NR is designed to operate at much higher frequencies such as 28 GHz or 39 GHz in frequency range 2 (FR2). Furthermore, many countries are making available more spectrums on frequency range 1 (FR1), such as 3.5 GHz, which is typically in higher frequencies than for LTE or 3G. Due to the higher frequencies, it is inevitable that the wireless channel will be subject to higher path-loss making it more challenging to maintain an adequate quality of service that is at least equal to that of legacy RATs. One key mobile application of particular importance is voice service for which a typical subscriber will always expect a ubiquitous coverage wherever he is.

For FR1, NR can be deployed either in newly allocated spectrums, such as 3.5 GHz, or in a spectrum re-farmed from a legacy network, for example, 3G and 4G. In either case, coverage will be a critical issue considering the fact that these spectrums will most likely handle key mobile services such as voice and low-rate data services. For FR2, coverage was not thoroughly evaluated during the self-evaluation campaign towards IMT-2020 submission and not considered in Rel-16 enhancements. In these regards, a thorough understanding of NR coverage performance is needed while taking into account the support of latest NR specification.

In RAN #86, NR coverage enhancement was identified as one RAN work area for Rel-17. For FR1: Urban scenario (outdoor gNB serving indoor UEs), and rural scenario (including extreme long distance rural scenario, for example ISD=30 km), should be taken into account for coverage enhancement. VoIP and eMBB service should be taken into account for coverage enhancement. Both DL and UL should be taken into account for coverage enhancement. The coverage enhancement for UL (including PUSCH and PUCCH) should be prioritized. The target data rates were identified as: (1) Urban scenario: DL 10 Mbps, UL 1 Mbps; and (2) Rural scenario: DL 1 Mbps, UL 100 kbps.

For FR2: Indoor scenario (indoor gNB serving indoor UEs) and urban/suburban (including outdoor gNB serving outdoor UEs and outdoor gNB serving indoor UEs) scenario should be taken into account for coverage enhancement. eMBB is considered for coverage enhancement, and VoIP as second priority. Both DL and UL should be taken into account for coverage enhancement. And which channels should be considered depends on evaluation results. The target data rates were identified as: (1) Indoor scenario: DL 25 Mbps, UL 5 Mbps; (2) Urban scenario: DL [25 Mbps], UL [5 Mbps]; and (3) Suburban scenario: DL [1 Mbps], UL [50 kbps].

Regarding coverage enhancement, the following are some facts known from current 3GPP specifications. Coverage is one of key metrics since LTE rel-8. TTI-bundling since rel-8 is for coverage enhancement, but only for FDD case. After rel-8, more HARQ repetitions on TTI-bundling and TTI-bundling for TDD were introduced. Besides specification enhancement, implementation enhancements are effective for coverage enhancement too, such as joint channel estimation between multiple slots. In NR, signals had the flexibility on HARQ indication. It supports more HARQ repetitions on TTI-bundling and TTI-bundling for TDD since rel-15 NR. In LTE, channel responses on different subframes are associated with the same antenna port, while it's different in NR.

In addition, as specified in current 3GPP specifications, an antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial receiving parameters.

Moreover, if intra-slot frequency hopping is not enabled by higher layer parameter for a physical channel, the UE transmission shall be such that the channel over which a symbol on the antenna port used for uplink transmission is conveyed can be inferred from the channel over which another symbol on the same antenna port is conveyed if the two symbols correspond to the same slot.

If intra-slot frequency hopping is enabled by higher layer parameter for a physical channel, the UE transmission shall be such that the channel over which a symbol on the antenna port used for uplink transmission is conveyed can be inferred from the channel over which another symbol on the same antenna port is conveyed only if the two symbols correspond to the same frequency hop, regardless of whether the frequency hop distance is zero or not.

In view of the foregoing state of the art, by now it is unclear how to support a joint channel estimation of a plurality of channels associated with different slots between a network device and a terminal device. It is also unclear how to indicate transmissions in a slot without reference signals (such as, DMRS-less transmissions) between a network device and a terminal device. Further, it is unclear how to early terminate PUSCH repetitions if a network device already successfully receives the PUSCH from a terminal device.

In order to solve the above technical problems and potentially other technical problems in conventional solutions, embodiments of the present disclosure provide a solution for coverage enhancement. In some embodiments, a network device can inform a terminal device of inferring relations between a plurality of channels associated with different slots, for example, using downlink control information (DCI) indication or a radio resource control (RRC) indication. In some other embodiments, a network device can inform a terminal device of a slot in which no reference signals are to be transmitted (such as a DMRS-less slot), for example, using a DCI indication or an RRC indication. In some further embodiments, a network device can inform a terminal device of an early termination of a plurality of transmissions of same data, for example, using a new UL grant to overwrite a previous UL grant for the plurality of transmissions.

With embodiments of the present disclosure, joint channel estimations can be done on the same port across multiple slots, a slot without reference signals (such as a DMRS-less slot) may have more resources for data transmission and may increase the throughput of communication, and a UE can early terminate UL repetitions and resources can be used for new transmissions to increase UL communication throughput. Therefore, embodiments of the present disclosure effectively enhance coverage of communications, thereby improving communication performance. Principles and implementations of the present disclosure will be described in detail below.

FIG. 1 is a schematic diagram of a communication environment 100 in which some embodiments of the present disclosure can be implemented. As shown in FIG. 1, the communication environment 100, which may also be referred to as the communication network 100, includes a network device 110 serving a terminal device 120 located in a cell 105 of the network device 110. In particular, the terminal device 120 may communicate with the network device 110 via a communication channel 115. For transmissions from the network device 110 to the terminal device 120, the communication channel 115 may be referred to as a downlink channel, whereas for transmissions from the terminal device 120 to the network device 110, the communication channel 115 may alternatively be referred to as an uplink channel.

In some embodiments, the network device 110 and the terminal device 120 may communicate with each other based on time slots (or slots for short) as defined in the 3GPP specifications. For example, for subcarrier spacing configuration μ, slots are numbered $n_s^\mu \in \{0, \ldots, N_{slot}^{subframe,\mu}-1\}$ in an increasing order within a subframe and $n_{s,f}^\mu \in \{0, \ldots, N_{slot}^{frame,\mu}-1\}$ in an increasing order within a frame. There are $N_{symb}^{slot}$ consecutive Orthogonal Frequency Division Multiplexing (OFDM) symbols in a slot where $N_{symb}^{slot}$ depends on the cyclic prefix as given in related 3GPP specifications. The start of slot $n_s^\mu$ in a subframe is aligned in time with the start of OFDM symbol $n_s^\mu N_{symb}^{slot}$ in the same subframe. Other related definitions and information of slots can be found in existing or future 3GPP specifications.

In communications with the terminal device 120, the network device 110 (for example, an eNB or a gNB) may transmit downlink reference signals (RSs) such as Demodulation Reference Signal (DMRS), Channel State Information-Reference Signal (CSI-RS), Phase Tracking Reference Signal (PT-RS), fine time and frequency Tracking Reference Signal (TRS) and the like. The terminal device 120 (for example, user equipment) in the communication network 100 may receive the downlink RSs on allocated resources.

In addition, the terminal device 120 may also transmit uplink RSs to the network device 110 on corresponding allocated resources. For indicating the allocated resources and/or other necessary information for the RSs, the network device 110 may transmit RS configurations to the terminal device 120 prior to the transmissions of the RSs.

As used herein, a RS is a signal sequence (also referred to as "RS sequence") that is known by both the network device 110 and the terminal device 120. For example, a RS sequence may be generated and transmitted by the network device 110 based on a certain rule and the terminal device 120 may deduce the RS sequence based on the same rule. In transmission of downlink and uplink RSs, the network device 110 may allocate corresponding resources (also referred to as "RS resources") for the transmission and/or specify which RS sequence is to be transmitted.

In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements (REs) of a resource region allocated for RS transmission in time, frequency, and/or code domains. Such resource allocation information may be indicated to the terminal device 120 prior to the transmission of the RSs.

It is to be understood that the number of the terminal devices and the number of the network devices as shown in FIG. 1 are only for the purpose of illustration without suggesting any limitations. The communication environment 100 may include any suitable number of terminal devices, any suitable number of network devices, and any suitable number of other communication devices adapted for implementing embodiments of the present disclosure.

In addition, it would be appreciated that there may be various wireless communications as well as wireline communications (if needed) among all the communication devices. Moreover, it is noted that although the network device 110 is schematically depicted as a base station and the terminal device 120 is schematically depicted as a mobile phone in FIG. 1, it is understood that these depictions are only for example without suggesting any limitation. In other embodiments, the network device 110 may be any other wireless network device, and the terminal device 120 may be any other wireless communication device.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
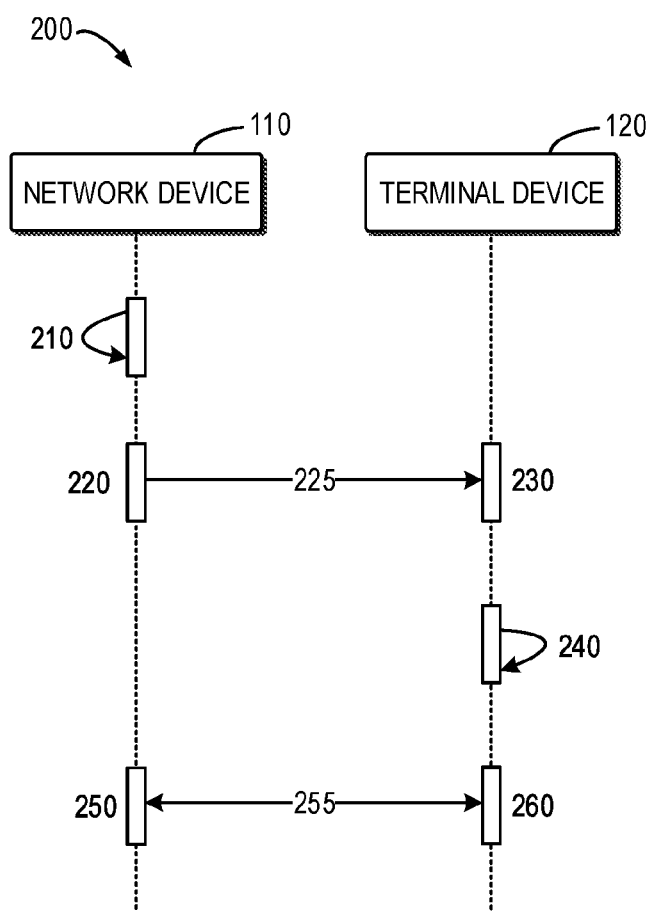
FIG. 2 illustrates an example communication process between a network device and a terminal device in accordance with some embodiments of the present disclosure.

FIG. 2 illustrates an example communication process 200 between the network device 110 and the terminal device 120 in accordance with some embodiments of the present disclosure. For the purpose of discussion, the communication process 200 will be described with reference to FIG. 1.

However, it would be appreciated that the communication process 200 may be equally applicable to any other communication scenarios where a network device and a terminal device communicate with each other.

As shown in FIG. 2, the network device 110 determines 210 whether a first channel associated with a first slot and a second channel associated with a second slot are to be inferable from each other. As used herein, the first channel may refer to the channel between the network device 110 and the terminal device 120 during the first slot, and the second channel may refer to the channel between the network device 110 and the terminal device 120 during the second slot. In general, since the channel between the network device 110 and the terminal device 120 may vary over time, the first channel associated with the first slot may be different from the second channel associated with the second slot.

For example, the difference between the first and second channels may be due to a change over time in a physical wireless channel between the network device 110 and the terminal device 120, a change over time in transmitting/receiving components (such as, RF components) of the network device 110, a change over time in transmitting/receiving components (such as, RF components) of the terminal device 120, or the like. Therefore, the network device 110 and the terminal device 120 normally cannot consider the first and second channels associated with different slots as inferable from each other. As a result, the first and second channels cannot be used as a uniform combined channel for performing communications between the network device 110 and the terminal device 120. For example, the first and second channels may need to be estimated separately by the network device 110 or the terminal device 120.

In order to solve this issue, according to some embodiments of the present disclosure, a new state between channels in different slots (or between different slots) may be introduced and called as "inferable," which means that a channel in one slot can be inferred from another channel in another slot. With the new inferable state, if the network device 110 determines and informs the terminal device 120 that the first and second channels are inferable from each other, both the network device 110 and the terminal device 120 should not to change their transmitting/receiving parameters across the first and second slots. In the meanwhile, both the network device 110 and the terminal device 120 can consider the physical wireless channel between them is unchanged. As such, the first and second channels may be considered as the same or similar, such that each of the first and second channels can be inferred from the other.

More particularly, with the new inferable state, in case intra-slot frequency hopping is not enabled, the UE transmission may be such that the channel over which a symbol on the antenna port used for an uplink transmission is conveyed can be inferred from the channel over which another symbol on the same antenna port is conveyed, if the two symbols correspond to the same slot or the two symbols correspond to different slots indicated as inferable.

Alternatively, in case intra-slot frequency hopping is enabled, the UE transmission may be such that the channel over which a symbol on the antenna port used for an uplink transmission is conveyed can be inferred from the channel over which another symbol on the same antenna port is conveyed, only if the two symbols correspond to the same frequency hop, regardless of whether the frequency hop distance is zero or not or the two symbols correspond to the same frequency hop index in different slots indicated as inferable.

Continuing with reference to FIG. 2, after determining 210 whether there is an inferring relation between the first and second channels, the network device 110 transmits 220 information 225 to the terminal device 120. The information 225 can indicate that if the first channel and the second channel are configured by the network device 110 to be inferable from each other. For example, if the network device 110 determines 210 that the first and second channels are to be inferable from each other, the information 225 may indicate that there is an inferring relation between the first and second channels. Alternatively, if the network device 110 determines 210 that the first and second channels are to be not inferable from each other, the information 225 may indicate that there is no inferring relation between the first and second channels. In other embodiments, in addition to the inferring relation between the first and second channels, the information 225 may also indicate inferring relations between other channels. Examples of such information 225 will be described in more detail later.

In general, the network device 110 can transmit the information 225 to the terminal device 120 in any suitable manner. For instance, the information 225 may be transmitted to the terminal device 120 using a specially designed signaling, such as a newly defined specialized message. In some embodiments, the network device 110 may use existing signaling between a network device and a terminal device to carry the information 225. For example, the information 225 may be included in a DCI from the network device 110 to the terminal device 120. As another example, an RRC message from the network device 110 to the terminal device 120 can include the information 225. These examples are also described in more detail later.

Continuing with reference to FIG. 2, after receiving 230 the information 225 from the network device 110, the terminal device 120 determines 240 whether the first and second channels are to be inferable from each other based on the information 225. In particular, if the information 225 indicates that the first and second channels are to be inferable from each other, the terminal device 120 can determine that there is an inferring relation between the two channels. In such case, the terminal device 120 may not change its transmitting/receiving parameters across the first and second slots, so as to ensure that the two channels are inferable from each other. On the contrary, if the information 225 indicates that the first and second channels are not to be inferable from each other, the terminal device 120 can determine that there is no inferring relation between the two channels. In this event, the terminal device 120 may use different transmitting/receiving parameters during the second slot compared to that during the first slot, if needed.

In the case that the first and second channels are determined 240 as inferable from each other, the terminal device 120 performs 260 communications 255 with the network device 110 on the first and second channels based on the inferring relation. From a perspective of the network device 110, it can also be said that the network device 110 performs 250 the communications 255 with the terminal device 120 on the first and second channels based on the inferring relation. For example, the first and second channels may be used by the network device 110 and the second device 120 as a uniform combined channel to perform the communications 255 between them, so as to simplify communication procedures or improve the performance of the communications 255.

It should be noted that the communications 255 may include both uplink transmissions from the terminal device 120 to the network device 110 and downlink transmissions from the network device 110 to the terminal device 120. That is, if the first and second channels are uplink channels from the terminal device 120 to the network device 110, the terminal device 120 can perform uplink transmissions to the network device 110 based on the inferring relation between the first and second channels.

As an example of such uplink transmissions, the terminal device 120 can transmit a set of reference signals, such as DMRSs, to the network device 110 in either or both of the first and second slots. Upon receiving the set of reference signals from the terminal device 120 in either or both of the first and second slots, the network device 110 may perform a joint channel estimation on the first and second channels based on the set of reference signals.

As used herein, the joint channel estimation generally has the meaning known in the art, which for example means that the reference signals in the first and second slots can be collectively used to perform a channel estimation on either or both of the first and second channels. In contrast, if the first and second channels cannot be inferred from each other, a joint channel estimation of the first and second channels is not possible, meaning that the reference signals in the first and second slots cannot be collectively used and the first and second channels need to be estimated separately.

There are various possible manners for the terminal device 120 to transmit the set of reference signals to the network device 110 in either or both of the first and second slots, as well as other reference signals in other slots. For example, the terminal device 120 may transmit the set of reference signals in one of the first and second slots, and transmit no reference signals in the other slot. As another example, the terminal device 120 may transmit some reference signals using zero power. As a further example, the terminal device 120 can transmit more reference signals in some slots. In a still further example, part of available frequency domain resources is used to transmit the set of reference signals. All these examples will be described in more detail later.

On the other hand, if the first and second channels are downlink channels from the network device 110 to the terminal device 120, the network device 110 can perform downlink transmissions to the terminal device 120 based on the inferring relation between the first and second channels. As an example of such downlink transmissions, the network device 110 may transmit a set of reference signals to the terminal device 120 in either or both of the first and second slots. Upon receiving the set of reference signals from the network device 110 in either or both of the first and second slots, the terminal device 120 may perform a joint channel estimation on the first and second channels based on the set of reference signals.

With the communication process 200, the network device 110 or the terminal device 120 can do joint channel estimations across multiple slots, for example, on the same antenna port, such that the performance of the communications 255 between the network device 110 and the terminal device 120 may be improved. In the following, various more embodiments of the present disclosure will be described with examples of uplink communications between the terminal device 120 and the network device 110. However, it should be appreciated that embodiments of the present disclosure are equally applicable to downlink communications between the terminal device 120 and the network device 110.

As described above, in some embodiments, the information 225 may be included in a DCI from the network device 110 to the terminal device 120. In this way, the inferring relations between the first and second channels as well as possible other channels associated with different slots may be configured by the network device 110 in a relative dynamic manner. For example, such a DCI may be the DCI scheduling the terminal device 120 to perform a transmission to the network device 110 in one of the first and second slots. In other words, the network device 110 uses the DCI to instruct the terminal device 120 to perform an uplink transmission to the network device 110 in the first slot. Alternatively, the network device 110 uses the DCI to instruct the terminal device 120 to perform an uplink transmission to the network device 110 in the second slot. In either case, the DCI may include the information 225 to indicate whether the first and second channels are to be inferable from each other.

In some embodiments, the information 225 may be indicated by a bit in the DCI. For example, one bit in a DCI scheduling a current slot may be used to indicate the inferable state between the current slot and the previous slot or the next slot. In particular, the value "0" of the bit may indicate that the current slot is inferable from the previous slot or that the next slot is inferable from the current slot. The value "1" of the bit may indicate that the current slot is not inferable from the previous slot or that the next slot is not inferable from the current slot. It is to be understood that the specific values of the bit are only for the purpose of illustration without suggesting any limitations. In other embodiments, any other suitable values of a bit can be used to indicate any other inferable state between channels or slots.

In case that the information 225 is included in the DCI associated with the first or second slot, after receiving the DCI from the network device 110, the terminal device 120 can determine whether the first and second channels are to be inferable from each other based on the bit in the DCI. In this way, the inferring relation between every two adjacent slots can be configured in a flexible way. In addition, a series of slots can be indicated as inferable from each other using such information included in a series of DCIs scheduling the series of slots, thereby avoiding an indication of inferring relations among more than two slots.

In some other embodiments, instead of using one bit in a DCI, the information 225 may be indicated by a number of bits in a DCI from the network device 110 to the terminal device 120. In particular, the bits can indicate a target inferring relation configuration of a plurality of inferring relation configurations indicated in an RRC message. The plurality of inferring relation configurations may indicate inferring relations between a plurality of channels associated with different slots including the first and second channels. The target inferring relation configuration may indicate whether the first and second channels are to be inferable from each other.

For example, the network device 110 can use x bits in the DCI to indicate the target inferring relation configuration, and x can be configured via a RRC message. As such, the overhead of the bitmap for indicating the target inferring relation configuration can be flexibly controlled through the RRC message. In particular, the bit width for this bitmap (or field) may be determined as $\log_2(I)$ bits, where I may be the number of entries in a higher layer parameter "pusch-SlotInferableList" if the higher layer parameter is configured. For instance, the parameter "pusch-SlotInferableList" can be made of "pusch-SlotInferable" entries which enumerate configured inferable patterns. In some embodiments, the function of a "pusch-SlotInferable" is like, for example the next n slots are inferable from the current slot, the inferable information is indicated in another DCI, or the like.

In the case that the information 225 is indicated by a number of bits in a DCI, upon receiving the DCI from the network device 110, the terminal device 120 may determine the target inferring relation configuration based on the bits in the DCI, and then determine whether the first and second channels are inferable from each other based on the target inferring relation configuration. In this way, a more complex indication of inferring relations among a plurality of channels or slots can be realized.

As described above, in some embodiments, instead of using a DCI, the information 225 can be alternatively included in an RRC message, thereby achieving a relative static indication of inferring relations between the first and second channels as well as other possible channels associated with different slots. For example, the information 225 in the RRC message may indicate that all channels associated with different slots between the terminal device 120 and the network device 110 are inferable from each other. More particularly, the information 225 in the RRC message may indicate that all UL slots associated with the terminal device 120 and the network device 110 are inferable. In this way, the inferring relations among channels associated with different slots can be greatly simplified.

Alternatively, the information 225 in the RRC message may indicate that a set of channels associated with different slots between the terminal device 120 and the network device 110 are inferable from each other. For example, the information 225 in the RRC message may indicate that some sets of UL slots associated with the terminal device 120 and the network device 110 are inferable from each other. In this way, the flexibility of the inferring relations among channels associated with different slots can be improved.

Alternatively, the information 225 in the RRC message may indicate that a plurality of channels associated with a plurality of slots scheduled by an uplink grant are inferable from each other. For example, the information 225 in the RRC can indicate that only slots in one UL grant are inferable from each other, and the slots in one UL grant are not inferable from other slots in another UL grant. The UL grant can be a dynamic grant or a configured grant, and an aggregation (repetition) or a multiple slot scheduling can be granted in the UL grant. In this way, a plurality of slots to be used for transmissions scheduled in a same grant can be configured to be inferable from each other, so as to improve the performance of the transmissions.

As indicated above, under the condition that the first and second channels as well as other possible channels associated with different slots are inferable from each other, the terminal device 120 can transmit a set of reference signals (such as DMRSs) in either or both of the first and second slots in one of various possible manners. For example, less or no DMRSs may be transmitted in some slots. As a result, DMRS overhead reduction enables more resources and energy for data channel and benefits coverage. More particularly, the UE behavior can be specified for the BS using DMRSs of consecutive slots for one PUSCH demodulation, which can also allow DMRS overhead reduction per slot.

Accordingly, in some embodiments, the terminal device 120 can transmit the set of reference signals in only one of the first and second slots and does not transmit any reference signals in the other slot. For example, the terminal device 120 may transmit the set of reference signals in the first slot without transmitting reference signals in the second slot. Accordingly, the network device 110 may receive the set of reference signals in the first slot and no reference signals in the second slot. In this way, the second slot may have more resources for data transmission and may increase the throughput.

In case the reference signals are DMRSs, the slot in which no DMRSs are transmitted may be referred to as a DMRS-less slot. Although no DMRS is transmitted in the DMRS-less slot, the channel associated with the DMRS-less slot can be inferred by another slot, which may be indicated using an inferable indication between the slots. Alternatively, if a slot is configured to be a DMRS-less slot, the channel in the DMRS-less slot is implicitly configured to be inferable from its adjacent slots.

In some embodiments, the network device 110 may transmit an indication to the terminal device 120 to indicate that no reference signal is to be transmitted in one or more slots, for example, the second slot of the aforementioned first and second slots. Accordingly, the terminal device 120 may receive the indication from the network device 110, and then transmit the set of reference signals only in the first slot without transmitting any reference signals in the second slot. In this way, the presence and position of a slot without reference signals can be configured and managed by the network device in an effective way.

For example, such an indication of slots without reference signals can be included in an RRC message, so as to achieve a relative static indication. More particularly, a PUSCH transmission in a slot of a multi-slot PUSCH transmission can be configured by a DMRS-less pattern, for example a bitmap, to indicate some slot(s) in multi-slot PUSCH transmission is DMRS-less. The RRC indication of the DMRS-less slots implies the channels of slots in the multi-slot PUSCH transmission are inferable from each other. In this way, a same RRC message can indicate the slots to be used for performing transmissions and also indicate which of these slots are to be slots without reference signals. Example of such indication included in a RRC message will be described in more detail below with reference to FIG. 3.

Figure 3:
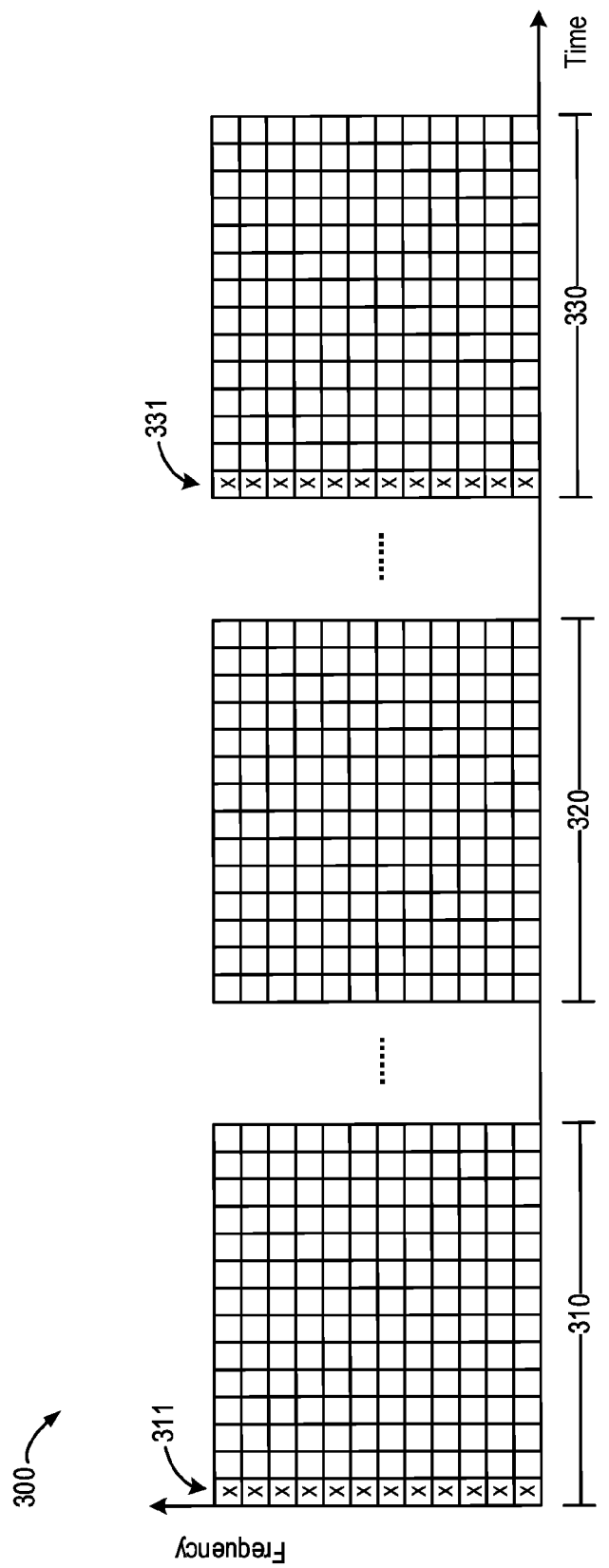
FIG. 3 illustrates an example of resource patterns for transmitting reference signals in different slots in accordance with some embodiments of the present disclosure.

FIG. 3 illustrates an example of resource patterns 300 for transmitting reference signals in different slots 310, 320, and 330 in accordance with some embodiments of the present disclosure. In FIG. 3, the horizontal axis represents time domain and the vertical axis represents frequency domain. As shown, the slot 310, the slot 320, and the slot 330 each include a plurality of resources, and each resource is represented by a block in the figure. In some embodiments, the resource may be a resource element as defined in the 3GPP specifications, which may correspond to an OFDM symbol in time domain and a subcarrier in frequency domain.

In the example of FIG. 3, it is assumed that the slot 310 is the aforementioned first slot, the slot 320 is the aforementioned second slot, and the slot 330 may be referred to as a third slot. It is also assumed that the network device 110 schedules the terminal device 120 to perform uplink transmissions in the first slot 310, the second slot 320, and the third slot 330. In this event, the network device 110 can transmit, to the terminal device 120, an RRC message indicating the first slot 310, the second slot 320, and the third slot 330 in which the terminal device 120 is to perform a plurality of transmissions to the network device 110. Moreover, the RRC message may include a bitmap indicating the second slot 320, which is configured as a slot without reference signals by the network device 110. As an example, the bitmap may be {1, 0, 1} in the scenario of FIG. 3. It is to be understood that the specific values of the bitmap are only for the purpose of illustration without suggesting any limitations. In other embodiments, any other suitable values may be possible.

Accordingly, the terminal device 120 may receive the RRC message from the network device 110, and then obtain the bitmap (for example, bitmap {1, 0, 1}) from the RRC message. Based on the bitmap, the terminal device 120 can know that reference signals are to be transmitted in the first and third slots 310 and 330, and no reference signal is to be transmitted in the second slot 320. Afterwards, the terminal device 120 may transmit reference signals (such as DMRSs) using the set of resources 311 in the first slot 310, transmit reference signals (such as DMRSs) using the set of resources 331 in the third slot 330, and transmit no reference signals in the second slot 320. It is to be understood that the specific sets of resources 311 and 331 for transmitting the reference signals are only for the purpose of illustration without suggesting any limitations. In other embodiments, any other suitable set of resources in a slot can be used for transmitting reference signals.

In some other embodiments, the indication of slots without reference signals can be included in a DCI from the network device 110 to the terminal device 120, so as to achieve a relative dynamic indication. For example, an unused value of an existing field of the DCI can be used to indicate a slot without reference signals. More particularly, the table associated with antenna port(s) as defined in the 3GPP specifications can be redefined by reusing the bits for the antenna port(s), which is shown in Table 1 as below. In Table 1, the values "1," "2," and "3" of the field "Number of DMRS CDM group(s) without data" refers to CDM groups {0}, {0,1}, and {0, 1, 2}, respectively, and the newly defined value "0" of the field may refer to a slot without reference signals, such as a DMRS-less slot. As such, the impact on the existing standards due to the indication of a slot without reference signals can be minimized.

the indications for slots without reference signals may be combined to reduce indication overhead.

As another example, instead of reusing an existing field of the DCI, a new one bit in the DCI may be used to indicate the current slot associated with the DCI is a slot without reference signals, such as, a DMRS-less slot. In other words, with respect to the aforementioned first and second slots, a predefined value (such as, value "0" or "1") of the bit can indicate that there are no reference signals to be transmitted in the second slot. In this manner, the slots without reference signals can be indicated in a more clear and explicit way.

In either of the existing field case and the new bit case, for indicating that no reference signals are to be transmitted in the second slot, the network device 110 may transmit, to the terminal device 120, a DCI scheduling the terminal device 120 to perform a transmission to the network device 110 in the second slot. In the DCI, an unused value of the existing field or a predefined value of the bit can indicate that the second slot is a slot without reference signals. Accordingly, the terminal device 120 may receive the DCI from the network device 110, and then determine the unused value of the existing field or the predefined value of the bit in the DCI to learn that no reference signal is to be transmitted in the second slot.

In some embodiments, as a possible manner for transmitting the set of reference signals in either or both of the first and second slots, the terminal device 120 can transmit, to the network device 110, a subset of the set of reference signals in the second slot using zero power. Accordingly, the network device 110 may estimate interference signals in resources used by the terminal device 120 to transmit the subset of the set of reference signals using zero power, thereby improving the accuracy of the estimation of the channels.

In other words, the transmission power of some reference signals (for example, DMRSs) may be zero, which can be

TABLE 1

Reusing of the bits of antenna port(s)

| One codeword: Codeword 0 enabled, Codeword 1 disabled | | | | Two Codewords: Codeword 0 enabled, Codeword 1 enabled | | | |
| --- | --- | --- | --- | --- | --- | --- | --- |
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| x | 0 | The same as inferred slot | 0 | x | 0 | The same as inferred slot | 0 |

In some embodiments, another newly defined table may have a combined encoded bit or field for indicating both a slot with/without reference signals and an inferable relation between the slot and another slot. For example, some indexes in the table can indicate a normal slot with reference signals (such as, DMRSs) and not inferable from another slot, some indexes in the table may indicate a normal slot with reference signals (such as, DMRSs) and inferable from another slot, some indexes in the table may indicate a slot without reference signals (such as a DMRS-less slot) and inferable from another slot, and/or the like. In this way, the indications for the inferring relations among channels and similar to zero power CSI-RS as defined in the 3GPP specifications. It is noted that for DMRS-less transmissions in a slot, the channel response in the slot can be inferred from another slot, but interference signals may be changed per slot. Thus, zero power DMRSs can be used to estimate interference signals in a particular slot, so as to estimate the channel in the slot more accurately. It is also noted that the amount of the reference signals of zero power can be less than normal reference signals, so as to reduce the resource overhead for the reference signals.

In some embodiments, if the first and second slots as well as possible other slots are inferable from each other, the amount of reference signals transmitted in either or both of the first and second slots may have more flexibility. In order to support such flexibility, the network device 110 can instruct the terminal device 120 to transmit further reference signals in addition to the set of reference signals. For example, the set of reference signals may be the reference signals which are predetermined or initially configured to be transmitted from the terminal device 120 to the network device 110. In this way, the flexible amount of reference signals in each slot can be achieved without an indication of slots of no reference signals, so as to minimize the impact on the existing standards. An example of such embodiments will be described below in more detail with reference to FIG. 4.

Figure 4:
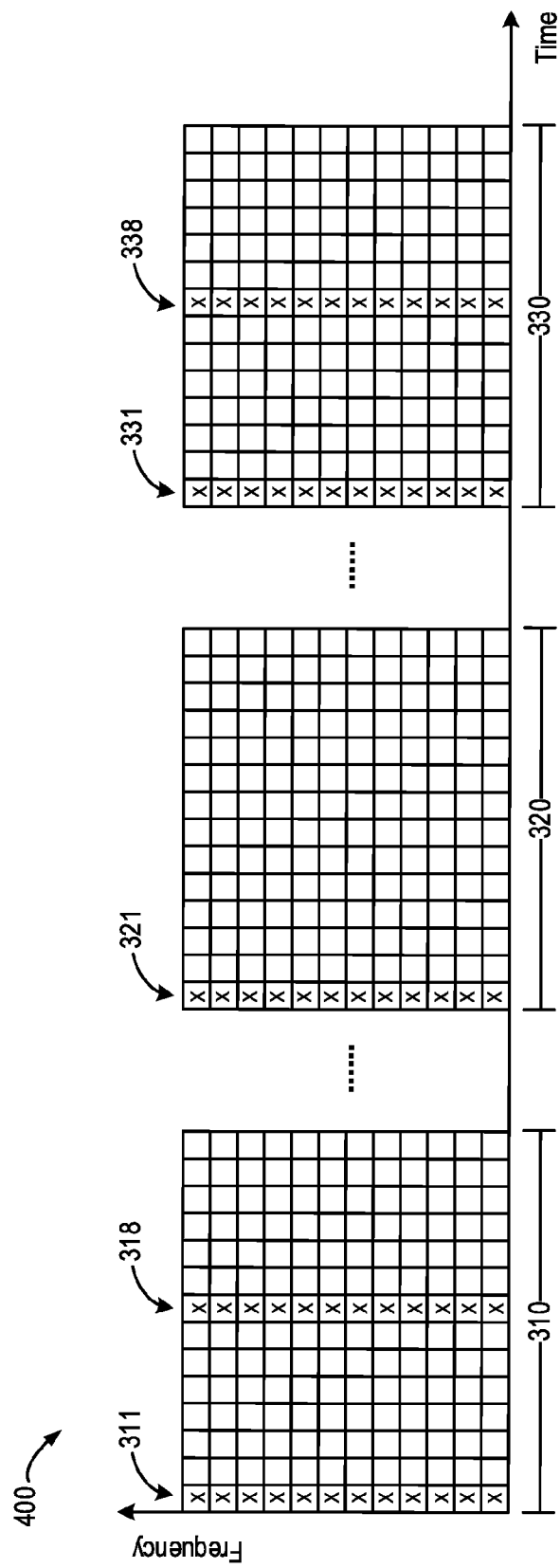
FIG. 4 illustrates another example of resource patterns for transmitting reference signals in different slots in accordance with some embodiments of the present disclosure.

FIG. 4 illustrates another example of resource patterns 400 for transmitting reference signals in different slots 310, 320, and 330 in accordance with some embodiments of the present disclosure. In FIG. 4, the horizontal axis represents time domain and the vertical axis represents frequency domain. As shown, the slot 310, the slot 320, and the slot 330 each include a plurality of resources, and each resource is represented by a block in the figure. In some embodiments, the resource may be a resource element as defined in the 3GPP specifications, which may correspond to an OFDM symbol in time domain and a subcarrier in frequency domain.

In the example of FIG. 4, it is assumed that the slot 310 is the aforementioned first slot, the slot 320 is the aforementioned second slot, and the slot 330 may be referred to as a third slot. It is also assumed that the set of resources 311 in the first slot 310 and the set of resources 321 in the second slot 320 are used to transmit the aforementioned set of reference signals in either or both of the first and second slots 310 and 320. In addition to the set of reference signals, the network device 110 can additionally instruct the terminal device 120 to transmit further reference signals using the set of resources 318 in the first slot 310. Similarly, it is assumed that the terminal device 120 is predetermined or initially configured to transmit reference signals in the set of resources 331 in the third slot 330, and the network device 110 may instruct the terminal device 120 to transmit further reference signals using the set of resources 338 in the third slot 330.

In particular, with regard to the set of reference signals to be transmitted in either or both of the first and second slots, the network device 110 may transmit, to the terminal device 120, an indication of further time domain resources (for example, the set of resources 318) in at least one of the first and second slots (the first slot 310 in the example of FIG. 4) for the terminal device 120 to transmit further reference signals in addition to the set of reference signals to the network device 110, which are predetermined or initially configured. Accordingly, the terminal device 120 may receive, from the network device 110, the indication of the further time domain resources (for example, the set of resources 318), and then transmit further reference signals in addition to the set of reference signals to the network device 110 using the further time domain resources (for example, the set of resources 318). The network device 110 may receive, from the terminal device 120, the further reference signals in at least one of the first and second slots (the first slot 310 in the example of FIG. 4) using the further time domain resources (for example, the set of resources 318).

As an example of such an indication, it is assumed that the network device 110 schedules, using a RRC message, the terminal device 120 to perform uplink transmissions in the first slot 310, the second slot 320, and the third slot 330. In this event, a bitmap in the RRC message may be used to indicate the further time domain resources for transmitting the further reference signals. For instance, a "DMRS-AdditionalPosition" field (or list) in the RRC message can indicate a pattern of further reference signals in multiple slots. More particularly, for the example as shown in FIG. 4, the "DMRS-AdditionalPosition" in the RRC message may be {pos1, pos0, pos1} to indicate that additional one set of time domain resources is used to transmit reference signals in the first and third slots 310 and 330. In other words, the number of each of "pos1," "pos0," and "pos1" can indicate the number of additional lines of time domain resources in a respective slot for transmitting reference signals in the slot.

In some embodiments, as another possible manner for transmitting the set of reference signals in either or both of the first and second slots, the terminal device 120 can use a pattern of resources in frequency domain to transmit reference signals in one of both of the first and second slots. For example, the network device 110 can use a bitmap representing the pattern of resources in frequency domain to indicate the presence of reference signals, such as, DMRSs. In this way, the selection of the resources for transmitting reference signals may have more flexibility in frequency domain. An example of such embodiments will be described in more detail below with reference to FIG. 5.

Figure 5:
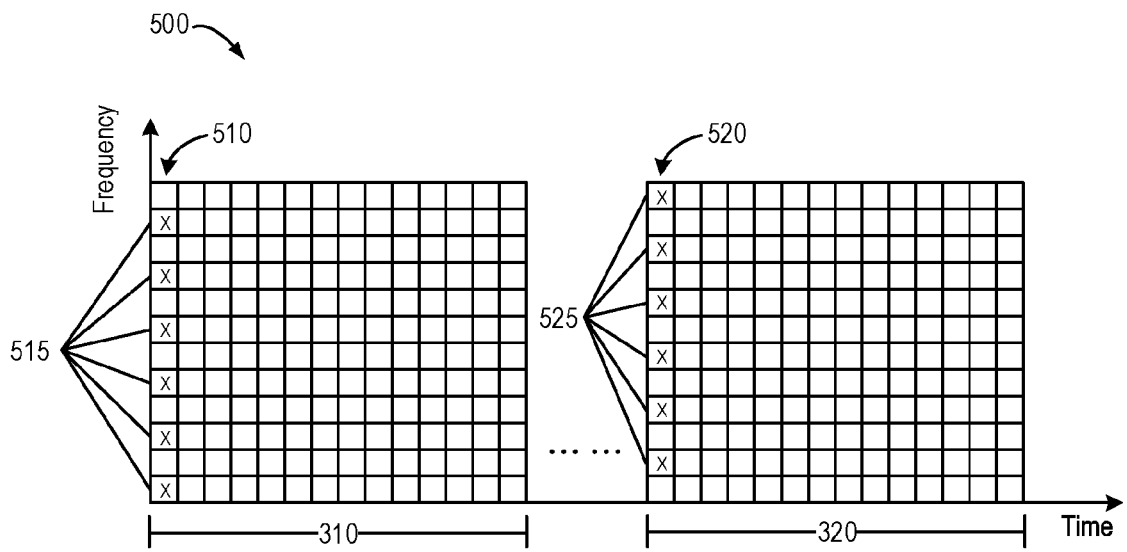
FIG. 5 illustrates a further example of resource patterns for transmitting reference signals in different slots in accordance with some embodiments of the present disclosure.

FIG. 5 illustrates a further example of resource patterns 500 for transmitting reference signals in different slots 310 and 320 in accordance with some embodiments of the present disclosure. In FIG. 5, the horizontal axis represents time domain and the vertical axis represents frequency domain. As shown, the slot 310 and the slot 320 each include a plurality of resources, and each resource is represented by a block in the figure. In some embodiments, the resource may be a resource element as defined in the 3GPP specifications, which may correspond to an OFDM symbol in time domain and a subcarrier in frequency domain.

In the example of FIG. 5, it is assumed that the slot 310 is the aforementioned first slot, and the slot 320 is the aforementioned second slot. The network device 110 can instruct the terminal device 120 to transmit a first subset 515 of the set of reference signals using a first set 510 of frequency domain resources in the first slot 310. In this particular example, the first set 510 of frequency domain resources may be the odd-numbered frequency domain resources.

In particular, the network device 110 may transmit, to the terminal device 120, an indication of the first set 510 of frequency domain resources within the first slot 310 for the terminal device 120 to transmit the first subset 515 of reference signals to the network device 110. Accordingly, the terminal device 120 can receive, from the network device 110, the indication of the first set 510 of frequency domain resources within the first slot 310, and then transmit, to the network device 110, the first subset 515 of reference signals in the first slot 310 using the first set 510 of frequency domain resources. Thus, the network device 110 may receive, from the terminal device 120, the first subset 515 of reference signals in the first slot 310 using the first set 510 of frequency domain resources.

In some embodiments, the presence of reference signals (such as, DMRSs) can hop per slot. In other words, the set of frequency domain resources in the first slot for transmitting reference signals can be different from that in the second slot for transmitting reference signals. In this way, different frequency domain resources in different slots can be selected for transmitting reference signals, so as to improve the channel estimation in frequency domain across a plurality of slots.

In particular, continuing with reference to FIG. 5, the network device 110 may transmit, to the terminal device 120, an indication of a second set 520 of frequency domain resources within the second slot 320 for the terminal device 120 to transmit a second subset 525 of the set of reference signals to the network device 110. As shown, the second set 520 of frequency domain resources is different from the first set 510 of frequency domain resources. In this particular example, the second set 520 of frequency domain resources may be the even-numbered frequency domain resources.

Accordingly, the terminal device 120 may receive the indication from the network device 110, and then transmit, to the network device 110, the second subset 525 of reference signals in the second slot 320 using the second set 520 of frequency domain resources. Thus, the network device 110 may receive, from the terminal device 120, the second subset 525 of reference signals in the second slot 320 using the second set 520 of frequency domain resources.

Figure 6:
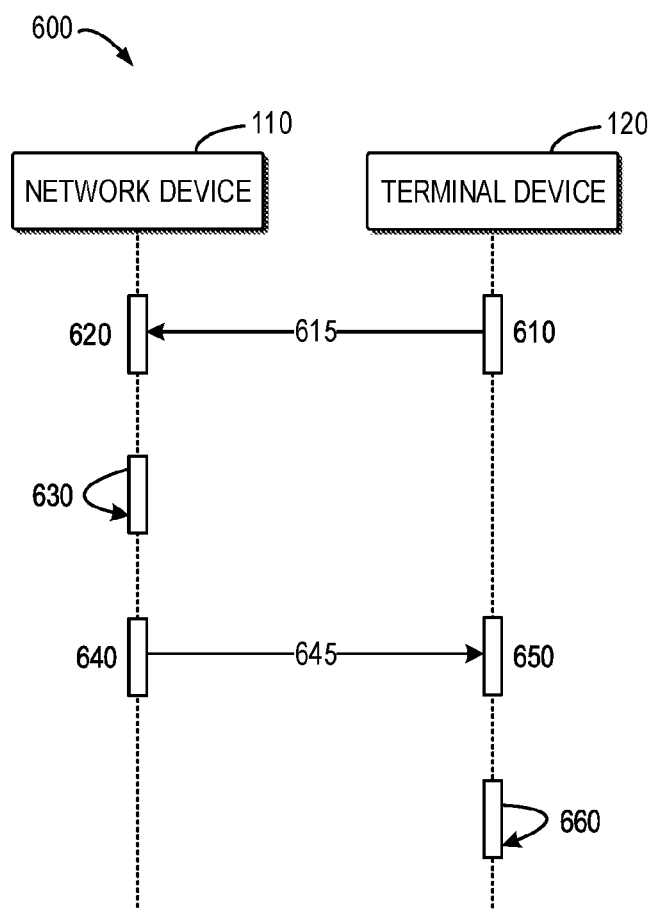
FIG. 6 illustrates another example communication process between a network device and a terminal device in accordance with some embodiments of the present disclosure.

FIG. 6 illustrates another example communication process 600 between the network device 110 and the terminal device 120 in accordance with some embodiments of the present disclosure. For the purpose of discussion, the communication process 600 will be described with reference to FIG. 1. However, it would be appreciated that the communication process 600 may be equally applicable to any other communication scenarios where a network device and a terminal device communicate with each other.

As shown in FIG. 6, the terminal device 120 transmits 610 a portion 615 of a plurality of transmissions of same data to the network device 110. For example, the terminal device 120 may be scheduled by the network device 110 to perform uplink repetitions, namely, to transmit the same data to the network device 110 for a predetermined number of times, so as to enhance the coverage of the uplink transmissions. It is noted that in the example communication process 600, the plurality of transmissions from the terminal device 120 to the network device 110 are in progress and not completed, and thus only the portion 615 of the plurality of transmissions are performed, and the rest of the plurality of transmissions are not performed.

Continuing with reference to FIG. 6, the network device 110 determines 630 that the plurality of transmissions of the same data between the network device 110 and the terminal device 120 are not completed and the rest of the plurality of transmissions are to be stopped. For example, the network device 110 may already successfully receive the intended data through the portion 615 and thus the rest of the plurality of transmissions becomes unnecessary. In some other embodiments, the network device 110 may determine the rest of the plurality of transmissions to be stopped for any other reasons, for example, the network device 110 may decide to not to receive the data from the terminal device 120.

After determining 630 that the rest of the plurality of transmissions are to be stopped, the network device 110 transmits 640 an indication 645 of an early termination of the plurality of transmissions to the terminal device 120. Upon receiving 650 the indication 645, the terminal device 120 determines 660 that the rest of the plurality of transmissions are to be stopped if the plurality of transmissions are not completed. With the communication process 600, a UE can skip the rest of predetermined UL repetitions and resources can be used for new transmission to increase UL throughput. Therefore, the early termination can avoid unnecessary transmissions and save UL resources, so more coverage limited UEs can be supported.

In general, the network device 110 may transmit the indication 645 to the terminal device 120 in any suitable manner. For example, the network device 110 can transmit an explicit termination indication for early terminating the plurality of transmissions. As used herein, the explicit termination indication may also be termed as an end indication. In practice, if the early termination mechanism is configured (or enabled) by the high layer of a UE, when UE receives from a BS the end indication of uplink repetitions, the UE may stop the uplink repetitions.

In some other embodiments, the network device 110 can transmit the indication 645 in an implicit manner. For example, the network device 110 can use a DCI to implicitly terminate the plurality of transmissions of the same data. The DCI may schedule the terminal device 120 to perform a new transmission to the network device 110 in a first period overlapping a second period for performing the rest of the plurality of transmissions.

It is noted that as specified in current 3GPP specifications, for any HARQ process ID(s) in a given scheduled cell, the UE is not expected to transmit a PUSCH that overlaps in time with another PUSCH. Therefore, if the early termination mechanism is configured by the high layer, when UE receives a UL grant of a PUSCH transmission that overlaps in time with the PUSCH for repetitions, the UE may stop the repetitions and perform transmissions scheduled by the UL grant. In some scenarios, a UE can stop repetitions after decode the UL grant which may be before the granted PUSCH. That is, a UE can overwrite the uplink grant for repetitions if it has capability of the early termination of the repetitions.

Alternatively, for implicitly terminating the plurality of transmissions of the same data, the network device 110 may transmit another DCI different from the above one scheduling an overlapping transmission. This different DCI may indicate a same hybrid automatic repeat request (HARQ) process number (ID) and a toggled new data indicator (NDI) compared to a previous DCI scheduling the plurality of transmissions. Therefore, if the early termination mechanism is configured by the high layer, when a UE receives a UL grant of a PUSCH with the same HARQ ID and toggled NDI, the UE can know that the data is successfully received by a base station and can thus stop the repetitions.

Alternatively, for implicitly terminating the plurality of transmissions of the same data, the network device 110 may transmit a positive feedback indicating a successful reception of the data of the plurality of transmissions. Upon receiving the positive feedback from the network device 110, the terminal device 120 may know that the rest of the plurality of transmissions are unnecessary and can be stopped. More particularly, if the early termination mechanism is configured by the high layer, when a UE receives an acknowledgement (ACK) message for the repetitions, the UE can stop the repetitions. In this way, the overhead of the indication can be reduced compared to the DCI with the same HARQ ID and a toggled NDI.

Figure 7:
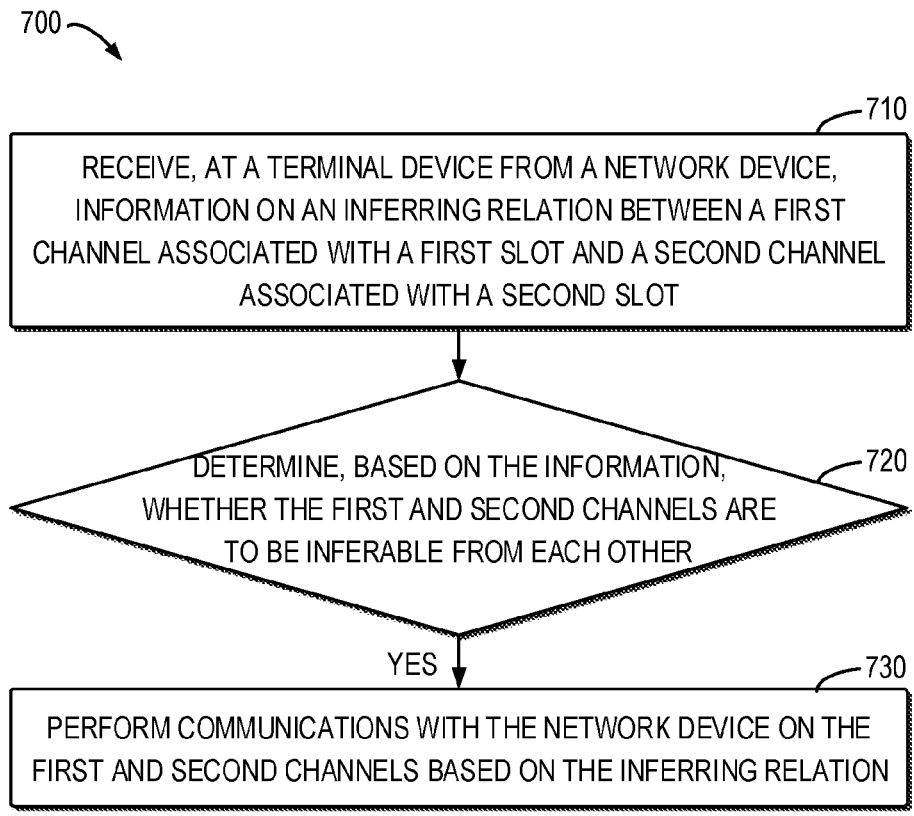
FIG. 7 illustrates a flowchart of an example method in accordance with some embodiments of the present disclosure.

FIG. 7 illustrates a flowchart of an example method 700 in accordance with some embodiments of the present disclosure. In some embodiments, the method 700 can be implemented at a terminal device, such as the terminal device 120 as shown in FIG. 1. Additionally or alternatively, the method 700 can also be implemented at other terminal devices not shown in FIG. 1. For the purpose of discussion, the method 700 will be described with reference to FIG. 1 as performed by the terminal device 120 without loss of generality.

At block 710, the terminal device 120 receives, from the network device 110, information on an inferring relation between a first channel associated with a first slot and a second channel associated with a second slot. At block 720, the terminal device 120 determines, based on the information, whether the first and second channels are to be inferable from each other. At block 730, in accordance with a determination that the first and second channels are to be inferable from each other, the terminal device 120 performs communications with the network device 110 on the first and second channels based on the inferring relation.

In some embodiments, the information is included in downlink control information, DCI.

In some embodiments, determining whether the first and second channels are to be inferable from each other comprises: determining that the first and second channels are to be inferable from each other, based on a bit in the DCI scheduling the terminal device 120 to perform a transmission to the network device 110 in one of the first and second slots.

In some embodiments, determining whether the first and second channels are to be inferable from each other comprises: determining, based on a number of bits in the DCI, a target inferring relation configuration of a plurality of inferring relation configurations indicated in an RRC message, the plurality of inferring relation configurations indicating inferring relations between a plurality of channels associated with different slots including the first and second channels; and determining that the first and second channels are to be inferable from each other based on the target inferring relation configuration.

In some embodiments, the number of bits is indicated by the RRC message.

In some embodiments, the information is included in an RRC message and indicates one of the following: all channels associated with different slots between the terminal device 120 and the network device 110 are inferable from each other; a set of channels associated with different slots between the terminal device 120 and the network device 110 are inferable from each other; and a plurality of channels associated with a plurality of slots scheduled by an uplink grant are inferable from each other.

In some embodiments, performing the communications comprises: transmitting a set of reference signals to the network device 110 in at least one of the first and second slots, such that the network device 110 performs a joint channel estimation on the first and second channels based on the set of reference signals.

In some embodiments, transmitting the set of reference signals comprises: transmitting the set of reference signals in the first slot without transmitting reference signals in the second slot.

In some embodiments, the method 700 further comprises: receiving, from the network device 110, an indication that no reference signal is to be transmitted in the second slot.

In some embodiments, receiving the indication comprises: receiving, from the network device 110, an RRC message indicating a plurality of slots in which the terminal device 120 is to perform a plurality of transmissions to the network device 110; and obtaining, from the RRC message, a bitmap indicating the second slot of the plurality of slots.

In some embodiments, receiving the indication comprises: receiving, from the network device 110, a DCI scheduling the terminal device 120 to perform a transmission to the network device 110 in the second slot; and determining an unused value of an existing field or a predefined value of a bit in the DCI, the unused value or the predefined value indicating that no reference signal is to be transmitted in the second slot.

In some embodiments, transmitting the set of reference signals comprises: transmitting, to the network device 110, a subset of the set of reference signals in the second slot using zero power.

In some embodiments, the method 700 further comprises: receiving, from the network device 110, an indication of further time domain resources in at least one of the first and second slots for the terminal device 120 to transmit further reference signals in addition to the set of reference signals to the network device 110; and transmitting, to the network device 110, the further reference signals in at least one of the first and second slots using the further time domain resources.

In some embodiments, transmitting the set of reference signals comprises: in accordance with receiving, from the network device 110, an indication of a first set of frequency domain resources within the first slot for the terminal device 120 to transmit a first subset of the set of reference signals to the network device 110, transmitting, to the network device 110, the first subset of reference signals in the first slot using the first set of frequency domain resources.

In some embodiments, the method 700 further comprises: receiving, from the network device 110, an indication of a second set of frequency domain resources within the second slot for the terminal device 120 to transmit a second subset of the set of reference signals to the network device 110, the second set of frequency domain resources being different from the first set of frequency domain resources; and transmitting, to the network device 110, the second subset of reference signals in the second slot using the second set of frequency domain resources.

In some embodiments, performing the communications comprises: receiving a set of reference signals from the network device 110 in at least one of the first and second slots; and performing a joint channel estimation on the first and second channels based on the set of reference signals.

Figure 8:
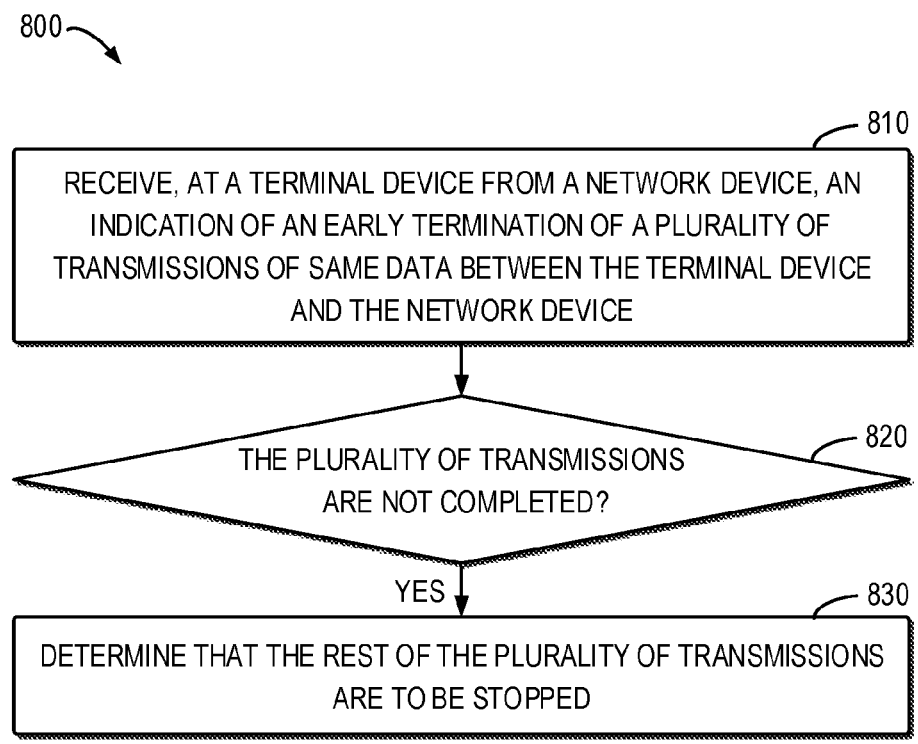
FIG. 8 illustrates a flowchart of another example method in accordance with some embodiments of the present disclosure.

FIG. 8 illustrates a flowchart of another example method 800 in accordance with some embodiments of the present disclosure. In some embodiments, the method 800 can be implemented at a terminal device, such as the terminal device 120 as shown in FIG. 1. Additionally or alternatively, the method 800 can also be implemented at other terminal devices not shown in FIG. 1. For the purpose of discussion, the method 800 will be described with reference to FIG. 1 as performed by the terminal device 120 without loss of generality.

At block 810, the terminal device 120 receives, from the network device 110, an indication of an early termination of a plurality of transmissions of same data between the terminal device 120 and the network device 110. At block 820, the terminal device 120 determines whether the plurality of transmissions are not completed. At block 830, in accordance with a determination that the plurality of transmissions are not completed, the terminal device 120 determines that the rest of the plurality of transmissions are to be stopped.

In some embodiments, the indication includes one of the following: a DCI scheduling the terminal device 120 to perform a new transmission to the network device 110 in a first period overlapping a second period for performing the rest of the plurality of transmissions; a DCI indicating a same HARQ process number and a toggled NDI compared to a previous DCI scheduling the plurality of transmissions; a positive feedback indicating a successful reception of the data of the plurality of transmissions; and an explicit termination indication for early terminating the plurality of transmissions.

Figure 9:
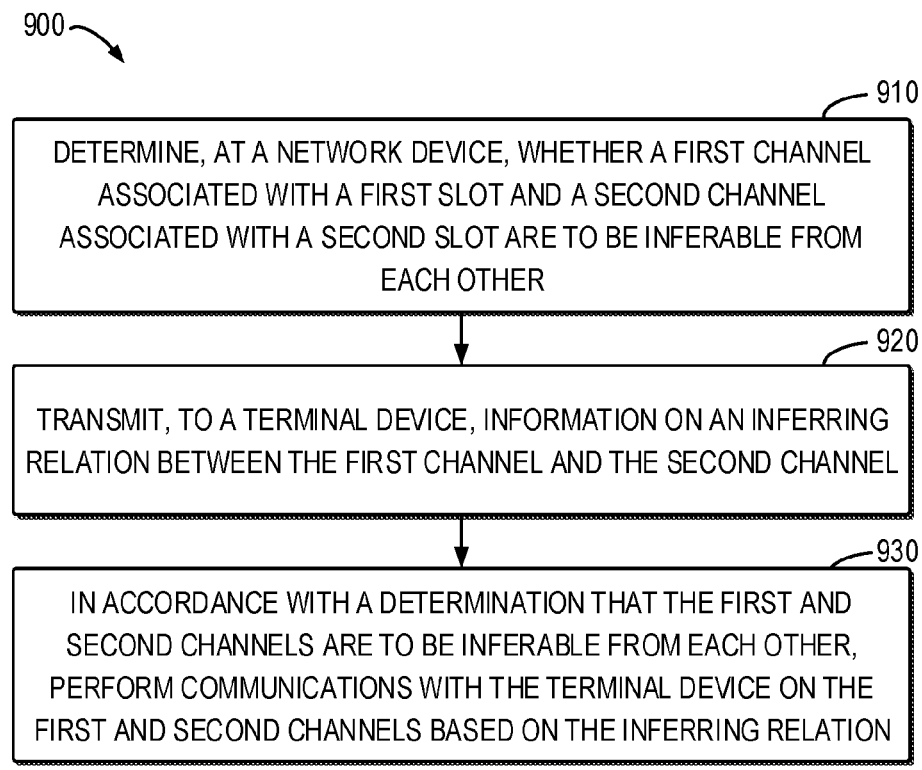
FIG. 9 illustrates a flowchart of a further example method in accordance with some embodiments of the present disclosure.

FIG. 9 illustrates a flowchart of a further example method 900 in accordance with some embodiments of the present disclosure. In some embodiments, the method 900 can be implemented at a network device, such as the network device 110 as shown in FIG. 1. Additionally or alternatively, the method 900 can also be implemented at other network devices not shown in FIG. 1. For the purpose of discussion, the method 900 will be described with reference to FIG. 1 as performed by the network device 110 without loss of generality.

At block 910, the network device 110 determines whether a first channel associated with a first slot and a second channel associated with a second slot are to be inferable from each other. At block 920, the network device 110 transmits, to the terminal device 120, information on an inferring relation between the first channel and the second channel. At block 930, in accordance with a determination that the first and second channels are to be inferable from each other, the network device 110 performs communications with the terminal device 120 on the first and second channels based on the inferring relation.

In some embodiments, the information is included in downlink control information, DCI.

In some embodiments, the information is indicated by a bit in the DCI scheduling the terminal device 120 to perform a transmission to the network device 110 in one of the first and second slots.

In some embodiments, the information is indicated by a number of bits in the DCI, the bits indicating a target inferring relation configuration of a plurality of inferring relation configurations indicated in an RRC message, the plurality of inferring relation configurations indicating inferring relations between a plurality of channels associated with different slots including the first and second channels; and the target inferring relation configuration indicates that the first and second channels are to be inferable from each other.

In some embodiments, the number of bits is indicated by the RRC message.

In some embodiments, the information is included in an RRC message and indicates one of the following: all channels associated with different slots between the terminal device 120 and the network device 110 are inferable from each other; a set of channels associated with different slots between the terminal device 120 and the network device 110 are inferable from each other; and a plurality of channels associated with a plurality of slots scheduled by an uplink grant are inferable from each other.

In some embodiments, performing the communications comprises: receiving a set of reference signals from the terminal device 120 in at least one of the first and second slots; and performing a joint channel estimation on the first and second channels based on the set of reference signals.

In some embodiments, receiving the set of reference signals comprises: receiving the set of reference signals in the first slot and no reference signals in the second slot.

In some embodiments, the method 900 further comprises: transmitting, to the terminal device 120, an indication that no reference signal is to be transmitted in the second slot.

In some embodiments, transmitting the indication comprises: transmitting, to the terminal device 120, an RRC message indicating a plurality of slots in which the terminal device 120 is to perform a plurality of transmissions to the network device 110, the RRC message including a bitmap indicating the second slot of the plurality of slots.

In some embodiments, transmitting the indication comprises: transmitting, to the terminal device 120, a DCI scheduling the terminal device 120 to perform a transmission to the network device 110 in the second slot, an unused value of an existing field or a predefined value of a bit in the DCI indicating that no reference signal is to be transmitted in the second slot.

In some embodiments, the method 900 further comprises: estimating interference signals in resources used by the terminal device 120 to transmit a subset of the set of reference signals in the second slot with zero power.

In some embodiments, the method 900 further comprises: transmitting, to the terminal device 120, an indication of further time domain resources in at least one of the first and second slots for the terminal device 120 to transmit further reference signals in addition to the set of reference signals to the network device 110; and receiving, from the terminal device 120, the further reference signals in at least one of the first and second slots using the further time domain resources.

In some embodiments, receiving the set of reference signals comprises: in accordance with transmitting, to the terminal device 120, an indication of a first set of frequency domain resources within the first slot for the terminal device 120 to transmit a first subset of the set of reference signals to the network device 110, receiving, from the terminal device 120, the first subset of reference signals in the first slot using the first set of frequency domain resources.

In some embodiments, the method 900 further comprises: transmitting, to the terminal device 120, an indication of a second set of frequency domain resources within the second slot for the terminal device 120 to transmit a second subset of the set of reference signals to the network device 110, the second set of frequency domain resources being different from the first set of frequency domain resources; and receiving, from the terminal device 120, the second subset of reference signals in the second slot using the second set of frequency domain resources.

In some embodiments, performing the communications comprises: transmitting a set of reference signals to the terminal device 120 in at least one of the first and second slots, such that the terminal device 120 performs a joint channel estimation on the first and second channels based on the set of reference signals.

Figure 10:
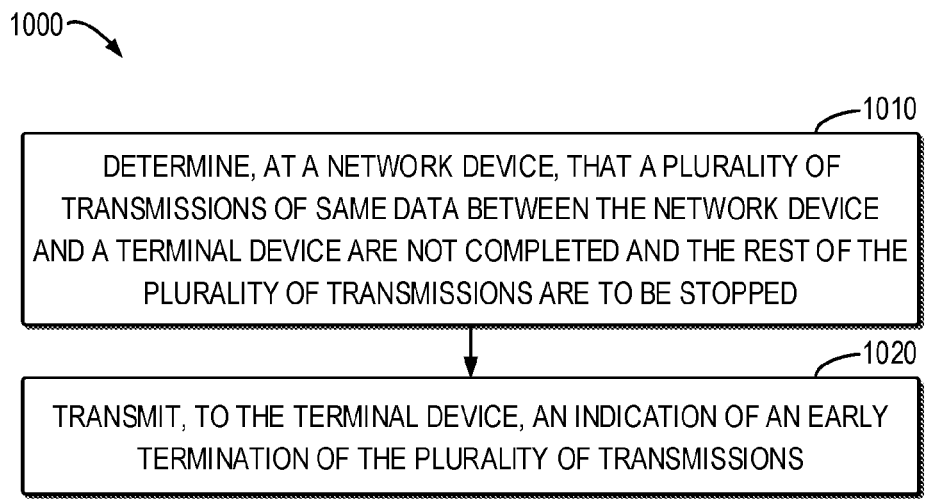
FIG. 10 illustrates a flowchart of a still further example method in accordance with some embodiments of the present disclosure.

FIG. 10 illustrates a flowchart of a still further example method 1000 in accordance with some embodiments of the present disclosure. In some embodiments, the method 1000 can be implemented at a network device, such as the network device 110 as shown in FIG. 1. Additionally or alternatively, the method 1000 can also be implemented at other network devices not shown in FIG. 1. For the purpose of discussion, the method 1000 will be described with reference to FIG. 1 as performed by the network device 110 without loss of generality.

At block 1010, the network device 110 determines that a plurality of transmissions of same data between the network device 110 and the terminal device 120 are not completed and the rest of the plurality of transmissions are to be stopped. At block 1020, the network device 110 transmits, to the terminal device 120, an indication of an early termination of the plurality of transmissions.

In some embodiments, the indication includes one of the following: a DCI scheduling the terminal device 120 to perform a new transmission to the network device 110 in a first period overlapping a second period for performing the rest of the plurality of transmissions; a DCI indicating a same HARQ process number and a toggled NDI compared to a previous DCI scheduling the plurality of transmissions; a positive feedback indicating a successful reception of the data of the plurality of transmissions; and an explicit termination indication for early terminating the plurality of transmissions.

Figure 11:
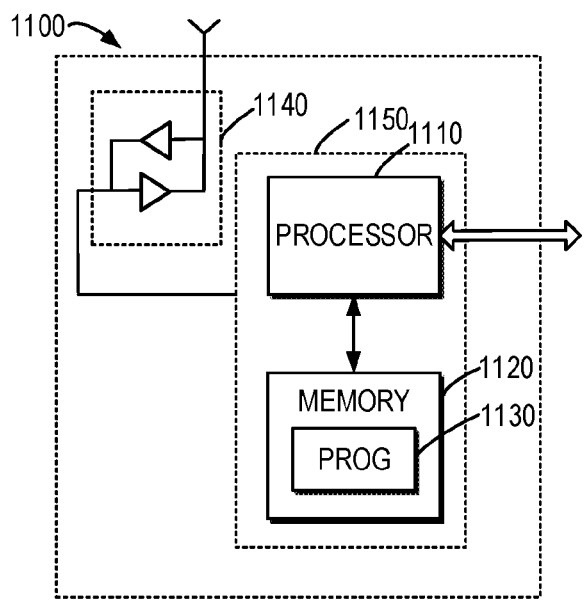
FIG. 11 is a simplified block diagram of a device that is suitable for implementing some embodiments of the present disclosure.

FIG. 11 is a simplified block diagram of a device 1100 that is suitable for implementing some embodiments of the present disclosure. The device 1100 can be considered as a further example embodiment of the network device 110 and the terminal device 120 as shown in FIG. 1. Accordingly, the device 1100 can be implemented at or as at least a part of the network device 110 and the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1120 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between gNBs or eNBs, Si interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1130 is assumed to include program instructions that, when executed by the associated processor 1110, enable the device 1100 to operate in accordance with the embodiments of the present disclosure, as discussed herein with reference to any of FIGS. 7-10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In some embodiments, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 7-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication performed by a terminal device, the method comprising:
    receiving first information from a network device,
        wherein the first information indicates whether a first channel, over which a first symbol on an antenna port used for uplink transmission is conveyed, can be inferred from a second channel, over which a second symbol on the antenna port is conveyed, if the first symbol and the second symbol are transmitted within a first time period comprising multiple slots, and
        wherein the first symbol and the second symbol correspond to repetitions or a grant over multiple slots of an uplink physical channel;
    transmitting the first symbol and the second symbol within the first time period.

2. The method of claim 1, wherein the first information is received in a radio resource control (RRC) message.

3. The method of claim 1, wherein the first time period comprises a first slot and a second slot, and
    wherein the first symbol is transmitted in the first slot, and the second symbol is transmitted in the second slot.

4. The method of claim 1, wherein the first information indicates the first time period.

5. The method of claim 1, further comprising:
    transmitting a demodulation reference signal (DMRS) for the repetitions or the grant over multiple slots of the uplink physical channel,
    wherein characteristics for channel estimation are maintained across the repetitions or the grant over multiple slots of the uplink physical channel.

6. The method of claim 5, wherein a channel estimation is performed across the repetitions or the grant over multiple slots of the uplink physical channel using the DMRS.

7. A method for communication performed by a network device, the method comprising:
    transmitting first information to a terminal device,
        wherein the first information indicates whether a first channel, over which a first symbol on an antenna port used for uplink transmission is conveyed, can be inferred from a second channel, over which a second symbol on the antenna port is conveyed, if the first symbol and the second symbol are transmitted within a first time period comprising multiple slots, and
        wherein the first symbol and the second symbol correspond to repetitions or a grant over multiple slots of an uplink physical channel; and
    receiving the first symbol and the second symbol within the first time period.

8. The method of claim 7, wherein the information is transmitted in a radio resource control (RRC) message.

9. The method of claim 7, wherein the first time period comprises a first slot and a second slot, and
    wherein the first symbol is transmitted in the first slot, and the second symbol is transmitted in the second slot.

10. The method of claim 7, wherein the first information indicates the first time period.

11. The method of claim 7, further comprising:
    receiving a demodulation reference signal (DMRS) for the repetitions or the grant over multiple slots of the uplink physical channel,
    wherein characteristics for channel estimation are maintained across the repetitions or the grant over multiple slots of the uplink physical channel.

12. The method of claim 11, further comprising:
    performing channel estimation across the repetitions or the grant over multiple slots of the uplink physical channel using the DMRS.

13. A terminal device comprising:
    a transceiver; and
    a processor configured to control the transceiver to:
        receive first information from a network device,
            wherein the first information indicates whether a first channel, over which a first symbol on an antenna port used for uplink transmission is conveyed, can be inferred from a second channel, over which a second symbol on the antenna port is conveyed, if the first symbol and the second symbol are transmitted within a first time period comprising multiple slots, and
            wherein the first symbol and the second symbol correspond to repetitions or a grant over multiple slots of an uplink physical channel; and
        transmitting the first symbol and the second symbol within the first time period.

14. The terminal device of claim 13, wherein the first information is received in a radio resource control (RRC) message.

15. The terminal device of claim 13, wherein the first time period comprises a first slot and a second slot, and
    wherein the first symbol is transmitted in the first slot, and the second symbol is transmitted in the second slot.

16. The terminal device of claim 13, wherein the first information indicates the first time period.

17. The terminal device of claim 13, further comprising:
    transmitting a demodulation reference signal (DMRS) for the repetitions of the uplink physical channel, wherein characteristics for channel estimation are maintained across the repetitions or the grant over multiple slots of the uplink physical channel.

18. The terminal device of claim 17, wherein a channel estimation is performed across the repetitions or the grant over multiple slots of the uplink physical channel using the DMRS.

* * * * *